United States Patent
Peng et al.

(10) Patent No.: US 9,984,336 B2
(45) Date of Patent: May 29, 2018

(54) CLASSIFICATION RULE SETS CREATION AND APPLICATION TO DECISION MAKING

(71) Applicant: Huawei Technologies Co., Ltd., Shenzhen (CN)

(72) Inventors: Yuan Peng, Shenzhen (CN); Yuanzhi Xie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 359 days.

(21) Appl. No.: 14/852,841

(22) Filed: Sep. 14, 2015

(65) Prior Publication Data

US 2016/0012352 A1    Jan. 14, 2016

Related U.S. Application Data

(63) Continuation of application No. PCT/CN2014/081010, filed on Jun. 27, 2014.

(51) Int. Cl.
G06N 99/00    (2010.01)

(52) U.S. Cl.
CPC ................... G06N 99/005 (2013.01)

(58) Field of Classification Search
None
See application file for complete search history.

(56) References Cited

U.S. PATENT DOCUMENTS

| | | | | |
|---|---|---|---|---|
| 6,466,929 | B1* | 10/2002 | Brown | G06K 9/6267 706/48 |
| 7,379,926 | B1 | 5/2008 | Belniak et al. | |
| 9,785,951 | B1* | 10/2017 | Coleman | G06Q 30/02 |
| 2002/0065752 | A1* | 5/2002 | Lewis | G06Q 30/04 705/35 |

(Continued)

FOREIGN PATENT DOCUMENTS

| | | |
|---|---|---|
| CN | 102567314 A | 7/2012 |
| CN | 102737126 A | 10/2012 |

(Continued)

OTHER PUBLICATIONS

Partial English Translation and Abstract of Chinese Patent Application No. CN102567314, Sep. 10, 2015, 6 pages.

(Continued)

*Primary Examiner* — Alan S Chen
(74) *Attorney, Agent, or Firm* — Conley Rose, P.C.

(57) ABSTRACT

A data processing method and a computer system. The computer system may perform discretization processing on a data sample to obtain a data sample in a matrix form, train the data sample in the matrix form according to a preset classification method to obtain a classification rule set, and after converting the classification rule set into a classification rule set that can be recognized by a data decision-making platform, provide the classification rule set to the data decision-making platform, so that the data decision-making platform can perform data decision-making according to the classification rule set that is obtained by the computer system by conversion and can be recognized by the data decision-making platform. All the foregoing processes are automatically completed by the computer system, which avoids human participation.

18 Claims, 4 Drawing Sheets

(56) References Cited

U.S. PATENT DOCUMENTS

2002/0159641 A1* 10/2002 Whitney .............. G06K 9/6228
382/219
2007/0156749 A1 7/2007 Levin

FOREIGN PATENT DOCUMENTS

CN 102929896 A 2/2013
CN 103728507 A 4/2014

OTHER PUBLICATIONS

Wang, S., et al., "Application of association rules for medical image data mining," Computer Applications, vol. 25, No. 6, Jun. 2005, 2 pages.
English Translation of Wang, S., et al., "Application of association rules for medical image data mining," Computer Applications, vol. 25, No. 6, Jun. 2005, translation dated Dec. 4, 2015, 5 pages.
Shi, C., et al., "Intrusion detection based on algorithm of multi-decision tree," Computer Engineering and Design, vol. 25, No. 4, Apr. 2004, 3 pages.
English Translation of Shi, C., et al., "Intrusion detection based on algorithm of multi-decision tree," Computer Engineering and Design, vol. 25, No. 4, Apr. 2004, translation dated Dec. 4, 2015, 6 pages.
Foreign Communication From a Counterpart Application, PCT Application No. PCT/CN2014/081010, International Search Report dated Mar. 30, 2015, 8 pages.
Foreign Communication From a Counterpart Application, PCT Application No. PCT/CN2014/081010, Written Opinion dated Mar. 30, 2015, 6 pages.
Wu, G., et al., "MReC4.5: C4.5 ensemble classification with MapReduce," Fourth ChinaGrid Annual Conference, Aug. 21, 2009, pp. 249-255.
Mitchell, L., et al., "A parallel Random Forest implementation for R.," EPCC, Jan. 11, 2011, 16 pages.
Foreign Communication From a Counterpart Application, European Application No. 14884268.5, Extended European Search Report dated Sep. 19, 2016, 13 pages.

* cited by examiner

| | |
|---|---|
| A discretization node of a computer system performs discretization processing on a data sample to obtain a data sample in a matrix form, and stores the data sample in the matrix form | S201 |
| A master computing node of the computer system sends a decision tree computing command to each of decision tree computing nodes of the computer system, and each of the decision tree computing nodes trains, according to the decision tree computing command and by using a decision tree algorithm, a part of the data sample in the matrix form to obtain a classification rule in a decision tree form | S202 |
| The master computing node sends a test command to each of the decision tree computing nodes after it is determined that each of the decision tree computing nodes obtains the classification rule in the decision tree form, and each of the decision tree computing nodes obtains a test sample set from the data sample in the matrix form according to the test command, and tests the test sample set by using the classification rule in the decision tree form obtained by each of the decision tree computing nodes, to obtain a test result set | S203 |
| The master computing node acquires the test result set obtained by each of the decision tree computing nodes, and determines test accuracy according to a preset voting rule and the test result set obtained by each of the decision tree computing nodes; and when the test accuracy is within a preset proper range, step 205 is executed | S204 |
| Each of the decision tree computing nodes converts, according to an instruction of the master computing node or a preset conversion policy, the classification rule in the decision tree form of each of the decision tree computing nodes into a classification rule in a key-value form, and converts, by using an expression form that can be recognized by a data decision-making platform, the classification rule in the decision tree form of each of the decision tree computing nodes into a classification rule that can be recognized by the data decision-making platform | S205 |
| The master computing node acquires the classification rule that is obtained by each of the decision tree computing nodes and can be recognized by the data decision-making platform, to obtain a classification rule set that can be recognized by the data decision-making platform, where the classification rule set that can be recognized by the data decision-making platform is a set of the classification rules that are obtained by all of the decision tree computing nodes and can be recognized by the data decision-making platform; and provides the classification rule set that can be recognized by the data decision-making platform to the data decision-making platform | S206 |
| The master computing node sends a rule submission instruction to each of the decision tree computing nodes, and each of the decision tree computing nodes may provide, according to the rule submission instruction, the classification rule that is obtained by each of the decision tree computing nodes and can be recognized by the data decision-making platform to the data decision-making platform | S206' |

FIG. 2

CLASSIFICATION RULE SETS CREATION AND APPLICATION TO DECISION MAKING

CROSS-REFERENCE TO RELATED APPLICATIONS

This application is a continuation of International Application No. PCT/CN2014/081010, filed on Jun. 27, 2014, which is hereby incorporated by reference in its entirety.

TECHNICAL FIELD

Embodiments of the present disclosure relate to computer technologies, and in particular, to a data processing method and a computer system.

BACKGROUND

Data mining (DM) refers to a process of revealing implicit, previously unknown, and potentially valuable information from a large amount of data in a database, and is a hot issue studied in the artificial intelligence and database fields. By means of data mining, a rule of a large amount of data can be found by analyzing each piece of data among the large amount of data, and data of an enterprise can be analyzed in a highly automatic manner to make inductive reasoning and explore a potential pattern from the data, so that a decision maker can adjust a market strategy, reduce risks, and make a correct decision.

In recent years, with rapid development of computing capabilities, storage, and networks, a data volume accumulated by human beings is increasing exponentially, and it is increasingly important to perform data mining based on massive data. However, a process from performing modeling analysis on a data sample to applying a modeling result to performing data decision-making generally is not automatically completed by a machine, but needs to be implemented based on a plurality of human roles together with machine analysis. Using massive data processing in the financial field as an example, a financial modeling expert is generally required to perform modeling on a data sample based on business mining and analyzing software to obtain a model file; then, a rule development team converts the model file into a rule set configuration file; a data modeling team performs mapping between the rule set configuration file and data; and finally, a cloud computing team encapsulates and packetizes the rule set configuration file, and sends an encapsulated and packetized rule set configuration file to a data platform for data decision-making.

In the, a process from data modeling to data decision-making needs to be implemented based on a plurality of human roles together with machine analysis. Therefore, once a modeling condition or a data sample changes, a modeling result changes; and it takes a longer period of time to make a changed modeling result effective as a rule file, and apply the rule file to a data platform, which affects data decision-making.

SUMMARY

To resolve a problem, embodiments of the present disclosure provide a data processing method and a computer system.

According to a first aspect, an embodiment of the present disclosure provides a data processing method, where the method includes performing, by a computer system, discretization processing on a data sample to obtain a data sample in a matrix form, training, by the computer system, the data sample in the matrix form according to a preset classification method to obtain a classification rule set, converting, by the computer system using an expression form that can be recognized by a data decision-making platform, the classification rule set into a classification rule set that can be recognized by the data decision-making platform, and providing, by the computer system, the classification rule set that is obtained by conversion and can be recognized by the data decision-making platform to the data decision-making platform.

With reference to the first aspect, in a first possible implementation manner, the preset classification method is a decision tree algorithm; where the training, by the computer system, the data sample in the matrix form according to a preset classification method to obtain a classification rule set, and the converting, by the computer system using an expression form that can be recognized by a data decision-making platform, the classification rule set into a classification rule set that can be recognized by the data decision-making platform include training, by the computer system, the data sample in the matrix form according to the decision tree algorithm to obtain a classification rule set in a decision tree form; and converting, by the computer system using the expression form that can be recognized by the data decision-making platform, the classification rule set in the decision tree form into the classification rule set that can be recognized by the data decision-making platform.

With reference to the first possible implementation manner of the first aspect, in a second possible implementation manner, the computer system includes a master computing node and a plurality of decision tree computing nodes; where the training, by the computer system, the data sample in the matrix form according to the decision tree algorithm to obtain a classification rule set in a decision tree form includes sending, by the master computing node, a decision tree computing command to each of the decision tree computing nodes; and training, by each of the decision tree computing nodes according to the decision tree computing command and using the decision tree algorithm, a part of the data sample in the matrix form to obtain a classification rule in the decision tree form; where the classification rule set in the decision tree form is a set of the classification rules in the decision tree form obtained by all of the decision tree computing nodes.

With reference to the second possible implementation manner of the first aspect, in a third possible implementation manner, the sending, by the master computing node, a decision tree computing command to each of the decision tree computing nodes, and the training, by each of the decision tree computing nodes according to the decision tree computing command and using the decision tree algorithm, a part of the data sample in the matrix form to obtain the classification rule in the decision tree form include acquiring, by the master computing node, an algorithm configuration parameter, where the algorithm configuration parameter includes information about training samples in the data sample in the matrix form and information about an attribute that participates in decision tree generation; sending, by the master computing node, the decision tree computing command to each of the decision tree computing nodes, where the decision tree computing command carries the algorithm configuration parameter; and determining, by each of the decision tree computing nodes according to the algorithm configuration parameter carried by the decision tree computing command, the training samples and the attribute that participates in decision tree generation from the data sample in the matrix form, and training the determined training samples according to the determined attribute that participates in decision tree generation, to obtain the classification rule in the decision tree form.

With reference to the third possible implementation manner of the first aspect, in a fourth possible implementation manner, the method further includes sending, by the master computing node, a test command to each of the decision tree computing nodes after it is determined that each of the decision tree computing nodes obtains the classification rule in the decision tree form; obtaining, by each of the decision tree computing nodes, a test sample set from the data sample in the matrix form according to the test command, and testing the test sample set using the classification rule in the decision tree form obtained by each of the decision tree computing nodes, to obtain a test result set; acquiring, by the master computing node, the test result set obtained by each of the decision tree computing nodes; determining, by the master computing node, test accuracy according to a preset voting rule and the test result set obtained by each of the decision tree computing nodes; and when the test accuracy is within a preset proper range, executing, by the master computing node, the step of the converting the classification rule set into the classification rule set that can be recognized by the data decision-making platform.

With reference to the third or the fourth possible implementation manner of the first aspect, in a fifth possible implementation manner, the information about the training samples in the data sample in the matrix form includes a storage address of the data sample in the matrix form, a ratio of the training samples to test samples in the data sample in the matrix form, and a ratio of a randomly acquired sample to the data sample in the matrix form.

With reference to any one of the second to the fifth possible implementation manners of the first aspect, in a sixth possible implementation manner, the converting, by the computer system using the expression form that can be recognized by the data decision-making platform, the classification rule set in the decision tree form into the classification rule set that can be recognized by the data decision-making platform includes: converting, by each of the decision tree computing nodes according to an instruction of the master computing node or a preset conversion policy and using the expression form that can be recognized by the data decision-making platform, the classification rule in the decision tree form obtained by each of the decision tree computing nodes into the classification rule that can be recognized by the data decision-making platform; where the classification rule set that can be recognized by the data decision-making platform is a set of the classification rules that are obtained by all of the decision tree computing nodes and can be recognized by the data decision-making platform.

With reference to the sixth possible implementation manner of the first aspect, in a seventh possible implementation manner, the providing, by the computer system, the classification rule set that can be recognized by the data decision-making platform to the data decision-making platform includes acquiring, by the master computing node, the classification rule that is obtained by each of the decision tree computing nodes and can be recognized by the data decision-making platform, to obtain the classification rule set that can be recognized by the data decision-making platform; and providing, by the master computing node, the classification rule set that can be recognized by the data decision-making platform to the data decision-making platform.

With reference to any one of the second to the fifth possible implementation manners of the first aspect, in an eighth possible implementation manner, the converting, by the computer system using the expression form that can be recognized by the data decision-making platform, the classification rule set in the decision tree form into the classification rule set that can be recognized by the data decision-making platform includes converting, by each of the decision tree computing nodes according to an instruction of the master computing node or a preset conversion policy, the classification rule in the decision tree form obtained by each of the decision tree computing nodes into a classification rule in a key-value form; acquiring, by the master computing node, the classification rule in the key-value form obtained by each of the decision tree computing nodes, to obtain a classification rule set in the key-value form, where the classification rule set in the key-value form is a set of the classification rules in the key-value form obtained by all of the decision tree computing nodes; and converting, by the master computing node using the expression form that can be recognized by the data decision-making platform, the classification rule set in the key-value form into the classification rule set that can be recognized by the data decision-making platform; where the providing, by the computer system, the classification rule set that can be recognized by the data decision-making platform to the data decision-making platform includes providing, by the master computing node, the classification rule set that can be recognized by the data decision-making platform to the data decision-making platform.

With reference to the first aspect or any one of the first to the eighth possible implementation manners of the first aspect, in a ninth possible implementation manner, the expression form that can be recognized by the data decision-making platform is at least one of a regular expression and a binary expression.

According to a second aspect, an embodiment of the present disclosure provides a computer system, including a discretizing module configured to perform discretization processing on a data sample to obtain a data sample in a matrix form, and a processing module configured to train the data sample in the matrix form according to a preset classification method to obtain a classification rule set; convert, using an expression form that can be recognized by a data decision-making platform, the classification rule set into a classification rule set that can be recognized by the data decision-making platform; and provide the classification rule set that is obtained by conversion and can be recognized by the data decision-making platform to the data decision-making platform.

With reference to the second aspect, in a first possible implementation manner, the preset classification method is a decision tree algorithm; where the processing module is configured to train the data sample in the matrix form according to the decision tree algorithm to obtain a classification rule set in a decision tree form; and convert, using the expression form that can be recognized by the data decision-making platform, the classification rule set in the decision tree form into the classification rule set that can be recognized by the data decision-making platform.

With reference to the first possible implementation manner of the second aspect, in a second possible implementation manner, the processing module includes a master computing unit and a plurality of decision tree computing units; where the master computing unit is configured to send a decision tree computing command to each of the decision tree computing units; and each of the decision tree computing units is configured to train, according to the decision tree computing command and using the decision tree algorithm, a part of the data sample in the matrix form to obtain a classification rule in the decision tree form; where the classification rule set in the decision tree form is a set of the classification rules in the decision tree form obtained by all of the decision tree computing units.

With reference to the second possible implementation manner of the second aspect, in a third possible implementation manner, the master computing unit is configured to acquire an algorithm configuration parameter, where the algorithm configuration parameter includes information about training samples in the data sample in the matrix form and information about an attribute that participates in decision tree generation, and send the decision tree computing command to each of the decision tree computing units, where the decision tree computing command carries the algorithm configuration parameter; and each of the decision tree computing units is configured to determine, according to the algorithm configuration parameter carried by the decision tree computing command, the training samples and the attribute that participates in decision tree generation from the data sample in the matrix form, and train the determined training samples according to the determined attribute that participates in decision tree generation, to obtain the classification rule in the decision tree form.

With reference to the third possible implementation manner of the second aspect, in a fourth possible implementation manner, the master computing unit is further configured to send a test command to each of the decision tree computing units after it is determined that each of the decision tree computing units obtains the classification rule in the decision tree form; each of the decision tree computing units is further configured to obtain a test sample set from the data sample in the matrix form according to the test command, and test the test sample set using the classification rule in the decision tree form obtained by each of the decision tree computing units, to obtain a test result set; and the master computing unit is further configured to acquire the test result set obtained by each of the decision tree computing units, determine test accuracy according to a preset voting rule and the test result set obtained by each of the decision tree computing units, and when the test accuracy is within a preset proper range, execute an operation of converting the classification rule set into the classification rule set that can be recognized by the data decision-making platform.

With reference to the third or the fourth possible implementation manner of the second aspect, in a fifth possible implementation manner, the information about the training samples in the data sample in the matrix form includes a storage address of the data sample in the matrix form, a ratio of the training samples to test samples in the data sample in the matrix form, and a ratio of a randomly acquired sample to the data sample in the matrix form.

With reference to any one of the second to the fifth possible implementation manners of the second aspect, in a sixth possible implementation manner, each of the decision tree computing units is further configured to convert, according to an instruction of the master computing unit or a preset conversion policy and using the expression form that can be recognized by the data decision-making platform, the classification rule in the decision tree form obtained by each of the decision tree computing units into the classification rule that can be recognized by the data decision-making platform; where the classification rule set that can be recognized by the data decision-making platform is a set of the classification rules that are obtained by all of the decision tree computing units and can be recognized by the data decision-making platform.

With reference to the sixth possible implementation manner of the second aspect, in a seventh possible implementation manner, the master computing unit is further configured to acquire the classification rule that is obtained by each of the decision tree computing units and can be recognized by the data decision-making platform, to obtain the classification rule set that can be recognized by the data decision-making platform; and provide the classification rule set that can be recognized by the data decision-making platform to the data decision-making platform.

With reference to any one of the second to the fifth possible implementation manners of the second aspect, in an eighth possible implementation manner, each of the decision tree computing units is further configured to convert, according to an instruction of the master computing unit or a preset conversion policy, the classification rule in the decision tree form obtained by each of the decision tree computing units into a classification rule in a key-value form; and the master computing unit is further configured to acquire the classification rule in the key-value form obtained by each of the decision tree computing units, to obtain a classification rule set in the key-value form, where the classification rule set in the key-value form is a set of the classification rules in the key-value form obtained by all of the decision tree computing units; convert, using the expression form that can be recognized by the data decision-making platform, the classification rule set in the key-value form into the classification rule set that can be recognized by the data decision-making platform, and provide the classification rule set that can be recognized by the data decision-making platform to the data decision-making platform.

With reference to the second aspect or any one of the first to the eighth possible implementation manners of the second aspect, in a ninth possible implementation manner, the expression form that can be recognized by the data decision-making platform is at least one of a regular expression and a binary expression.

According to a third aspect, an embodiment of the present disclosure provides a computer system, including a processor, a memory, a bus, and a communications interface; where the memory is configured to store a computer executable instruction; the processor is connected to the memory using the bus, and when the computer system runs, the processor executes the computer executable instruction stored in the memory, so that the computer system executes the data processing method described according to the first aspect or the data processing method described according to any possible implementation manner of the first aspect.

According to a fourth aspect, an embodiment of the present disclosure provides a computer readable medium, including a computer executable instruction, so that when a processor of a computer executes the computer executable instruction, the computer executes the data processing method described according to the first aspect or the data processing method described according to any possible implementation manner of the first aspect.

In the embodiments of the present disclosure, a computer system may perform discretization processing on a data sample to obtain a data sample in a matrix form; train the data sample in the matrix form according to a preset classification method to obtain a classification rule set; and after converting the classification rule set into a classification rule set that can be recognized by a data decision-making platform, provide the classification rule set to the data decision-making platform, so that the data decision-making platform can perform data decision-making according to the classification rule set that is obtained by the computer system by conversion and can be recognized by the data decision-making platform. All the foregoing processes from training the data sample (that is, performing modeling on the data sample) to applying the classification rule set (that is, a modeling result) obtained by training to performing data decision-making are automatically completed by the computer system, which avoids human participation; and when the data sample changes or an original classification rule set needs to be updated, an updated classification rule set can be obtained in a timely manner, and the updated classification rule set is applied to the data decision-making platform in a timely manner for data decision-making.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2 is a flowchart of another data processing method according to an embodiment of the present disclosure.

DESCRIPTION OF EMBODIMENTS

Embodiments of the present disclosure provide a data processing method and a computer system, where the computer system may be used to complete all processes from training a data sample (that is, performing modeling on the data sample) to applying an obtained classification rule set (that is, a modeling result) to performing data decision-making. For specific implementation manners, refer to the embodiments.

Embodiment 1

Figure 1:
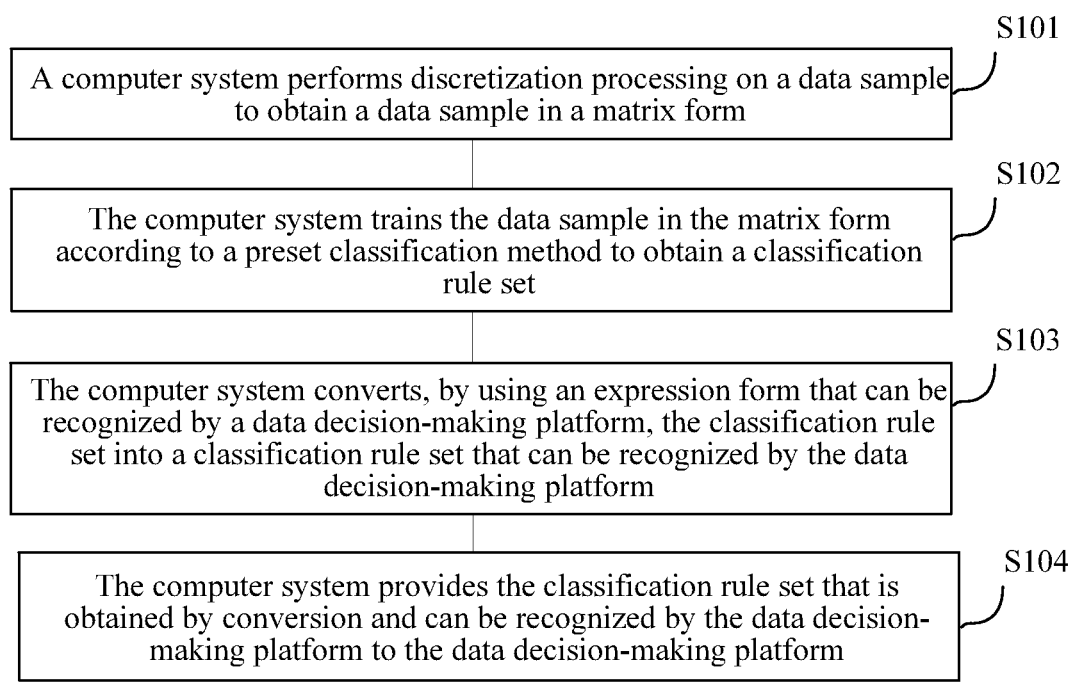
FIG. 1 is a flowchart of a data processing method according to an embodiment of the present disclosure.

This embodiment of the present disclosure provides a data processing method. As shown in FIG. 1, the method includes the following steps. 101: A computer system performs discretization processing on a data sample to obtain a data sample in a matrix form.

To analyze a data sample to obtain information that is implicit in the data sample and required for decision-making, a form of the data sample may be converted into a matrix. There may be a plurality of manners for converting the form of the data sample into the matrix. In this embodiment of the present disclosure, the data sample may be massive data; and in this case, the computer system may obtain the data sample in the matrix form in a manner of discretization processing performed on the data sample. In the manner of discretization processing, not only can the form of the data sample be converted into the matrix, but also computing efficiency may be improved.

In this embodiment of the present disclosure, discretization refers to mapping finite individuals in an infinite space to a finite space, to improve spatial-temporal efficiency of an algorithm. A basic idea of discretization is "considering only required values" among a plurality of possible cases. By performing discretization processing, when a range of input data is an infinite space or a large amount of input data is the same, mapping from an infinite input space to a logically finite and ordered space can be performed, and repetition is avoided, to improve spatial-temporal efficiency of an algorithm.

For example, it is assumed that a data sample includes age data "20; 11; 84; 16; 17; 41; 19; 21; 35; 29; 29; 27; 24; 67; . . . " of a large number of users. It is known that a lifespan is within a range; however, there are a large number of different values of ages. Discretization processing may be performed on this group of age data to map the age data to several finite intervals. A specific method is as follows. For a specific service, in many occasions, age presentation that is too consecutive actually is not of much concern, and attention needs to be paid only to several age groups, such as $S_1$ infancy (1 to 3 years old), $S_2$ early childhood (3 to 6 years old), $S_3$ childhood (6 to 12 years old), $S_4$ juvenile (12 to 18 years old), $S_5$ early adult age (18 to 30 years old), $S_6$ middle age (30 to 60 years old), and $S_7$ old age (over 60 years old). The foregoing age data may be mapped to the seven intervals. If the seven intervals are represented by characters with subscripts, after the discretization processing, the foregoing age data may be represented as [$S_5$; $S_3$; $S_7$; $S_4$; $S_4$; $S_6$; $S_5$; $S_5$; $S_6$; $S_5$; $S_5$; $S_5$; $S_5$; $S_7$; . . . ].

For another example, a data sample includes addresses of a large number of users, such as "No. XX, XX Street, Nanshan District, Shenzhen City; No. XX, XX road, Bantian, Longgang District, Shenzhen City; . . . ", which are finite individuals in an infinite space, and the address information includes a large number of character strings, which may consume a large number of computing resources. Actually, for a loan service, discretization processing may be performed on user addresses, and then the user addresses are mapped to several finite spaces. For example, the user addresses are mapped to the following three spaces: "$Q_1$ poor area; $Q_2$ middle-class area; $Q_3$ rich area", which effectively saves resources consumed for analyzing the data sample and improves computing efficiency.

During a practical application process, a data sample may include information about a large number of users, that is, a large number of samples, where information about each user may include information such as age, address, and savings; then, the age, the address, and the savings may each represent one attribute of the data sample, so that the ages of all the users in the sample are a group of attributes, the addresses of all the users in the sample is a group of attributes, and the like. During discretization processing, discretization processing may be performed on each group of attributes in the data sample, to finally obtain a data sample in a matrix form after the discretization processing.

For example, it is assumed that a data sample is {"user A, 25 years old, currently staying at No. XX, XX Street, Nanshan District, Shenzhen City, income 100,000-150,000 CNY per year, average credit record, . . . , and time deposit 30,000-50,000 CNY"; "user B, 11 years old, currently staying at No. XX, XX Street, Bao'an District, Shenzhen City, income 0-5,000 CNY per year, no credit record, . . . , and time deposit 400,000-450,000 CNY"; . . . ; and "user C, 28 years old, currently staying at No. XX, XX Street, Luohu District, Shenzhen City, income 400,000-500,000 CNY per year, average credit record, . . . , and time deposit 350,000-

400,000 CNY"}, which includes information about one hundred million users, where information about each user includes 50 types of information including age, current residence, income, credit record, . . . , and time deposit. In this case, when discretization processing is performed on the data sample, discretization processing may be separately performed on ages, current residences, incomes, credit records, and the like of the one hundred million users. After the discretization processing, the age of each user in the data sample may be represented by $S_i$ (i is an integer ranging from 1 to 7), where $S_i$ represents ages 1 to 3, $S_2$ represents ages 3 to 6, $S_3$ represents ages 6 to 12, $S_4$ represents ages 12 to 18, S5 represents ages 18 to 30, $S_6$ represents ages 30 to 60, and $S_7$ represents ages over 60. The current residence of each user in the data sample may be represented by $Q_j$ (j=1, 2, 3), where $Q_1$ represents staying at a poor area, Q2 represents staying at a middle-class area, $Q_3$ represents staying at a rich area, and the like. A final data sample in a matrix form that is obtained after the discretization processing may be shown in Table 1.

TABLE 1

| | Column 1 (Age) | Column 2 (Current Residence) | Column 3 (Income) | Column 4 (Credit Record) | ... | Column 50 (Time Deposit) |
|---|---|---|---|---|---|---|
| Row 1 (user A) | $S_5$ | 2 | $C_3$ | $H_2$ | ... | $M_3$ |
| Row 2 (user B) | $S_3$ | $Q_3$ | $C_5$ | $H_1$ | ... | $M_5$ |
| ... | ... | ... | ... | ... | ... | ... |
| Row 100,000,000 (user C) | $S_5$ | $Q_3$ | $C_2$ | $H_2$ | ... | $M_4$ |

It can be learned from Table 1 that the data sample in the matrix form obtained after the discretization processing consists of 100,000,000 rows and 50 columns. Column 1 of the matrix may represent the age, that is, the first group of attributes; column 2 may represent the current residence, that is, the second group of attributes; column 3 may represent the income, that is, the third group of attributes; column 4 may represent the credit record, that is, the fourth group of attributes; and column 50 may represent the time deposit, that is, the $50^{th}$ group of attributes. By converting the data sample into the data sample in the matrix form by performing discretization, not only can data sample analyzing and computing be conveniently performed in a plurality of manners, but also computing and storage resources may be saved to a great extent, which facilitates massive data processing.

102: The computer system trains the data sample in the matrix form according to a preset classification method to obtain a classification rule set.

Data analysis is mainly performed in two manners, including classification and prediction, which may be used to extract a model that can describe an important data set or predict a future data trend. The classification method (Classification) may be used to predict a discrete category (Categorical Label) of a data object, and the prediction method (Prediction) is used to predict consecutive values of the data object.

In this embodiment of the present disclosure, the computer system may use the classification method to analyze the data sample in the matrix form. Using the classification method, the computer system may train the data sample in the matrix form; discover the classification rule set in the data sample in the matrix form; and predict, according to the classification rule set, a category of production data on which a decision needs to be made subsequently on a data decision-making platform, to perform data decision-making. For example, a decision tree algorithm of the classification method may be used to train the data sample in the matrix form to obtain the classification rule set; therefore, the category of the production data on which a decision needs to be made subsequently on the data decision-making platform may be predicted according to the classification rule set, to perform data decision-making. For another example, the Bayesian algorithm or a user-defined algorithm of the classification method may be used to train the data sample in the matrix form to obtain the classification rule set. The training the data sample in the matrix form is performing modeling on the data sample in the matrix form; and the classification rule set obtained by training is a modeling result obtained by modeling.

Further, when the data sample is massive data, to quickly and efficiently process the massive data, the computer system may further train, according to the preset classification method, the data sample in the matrix form in a parallel computing manner to obtain the classification rule set. The parallel computing (also referred to as concurrent computing) is relative to serial computing, and refers to a process of resolving a computing problem using a plurality of computing resources at the same time. A basic idea of the parallel computing is to resolve a same problem using a plurality of processors in coordination, that is, to decompose the problem to be resolved into several parts, where one independent processor performs computing on each part in a parallel manner. The computer system may have a plurality of computing nodes, and the computer system may train the data sample in the matrix form using a plurality of computing nodes of the computer system to obtain the classification rule set. Each computing node of the plurality of computing nodes participates in the training, that is, participates in computing the classification rule set, which greatly improves computing efficiency. However, when modeling is performed on a data sample using business mining and analysis software, modeling cannot be performed on massive data.

It should be noted that throughout the present disclosure, the parallel computing includes distributed parallel computing (also referred to as distributed concurrent computing). By means of distributed parallel computing, a problem that requires a huge computing capability for resolving can be divided into a plurality of small parts; then, these parts are allocated to a plurality of computers for processing; and finally, computing results are synthesized to obtain a final result. Therefore, the computer system may be a supercomputer that includes a plurality of processors, or a distributed computer, for example, a cluster that includes several independent computers interconnected in a specific manner. In this case, the computing nodes may be processors, or independent computers, which is not limited in this embodiment of the present disclosure.

103: The computer system converts, using an expression form that can be recognized by a data decision-making platform, the classification rule set into a classification rule set that can be recognized by the data decision-making platform.

The foregoing classification rule set that is obtained using a preset classification algorithm generally may exist on a computer in a form of a variable or a character string. To allow the data decision-making platform to use classification rules to perform data decision-making on production data, the classification rule set needs to be converted into the expression form that can be recognized by the data decision-making platform. For example, if the data decision-making platform can recognize a regular expression, the computer system may convert the classification rule set into a regular rule set using a regular expression. For another example, if the data decision-making platform can recognize a binary expression, the computer system may compile the classification rule set into a classification rule set in a binary form (for ease of expression, the classification rule set in a binary form is subsequently referred to as a binary rule set).

The production data is data on which the data decision-making platform needs to perform data decision-making.

104: The computer system provides the classification rule set that is obtained by conversion and can be recognized by the data decision-making platform to the data decision-making platform.

The computer system provides the classification rule set that can be recognized by the data decision-making platform to the data decision-making platform, so that the data decision-making platform subsequently can predict a category of the production data according to the classification rule set provided by the computer system, to perform data decision-making.

In practical application, the data decision-making platform may be a cloud platform, a service system including a computer, or the like, which is not limited in this embodiment of the present disclosure.

In this embodiment of the present disclosure, a computer system may perform discretization processing on a data sample to obtain a data sample in a matrix form; train the data sample in the matrix form according to a preset classification method to obtain a classification rule set; and after converting the classification rule set into a classification rule set that can be recognized by a data decision-making platform, provide the classification rule set to the data decision-making platform, so that the data decision-making platform can perform data decision-making according to the classification rule set that is obtained by the computer system by conversion and can be recognized by the data decision-making platform. All the foregoing processes from training the data sample (that is, performing modeling on the data sample) to applying the classification rule set (that is, a modeling result) obtained by training to performing data decision-making are automatically completed by the computer system, which avoids human participation; and when the data sample changes or an original classification rule set needs to be updated, an updated classification rule set can be obtained in a timely manner, and the updated classification rule set is applied to the data decision-making platform in a timely manner for data decision-making.

Embodiment 2

This embodiment of the present disclosure provides a data processing method. As shown in FIG. 2, a computer system may train, according to a decision tree algorithm, a data sample in a matrix form in a parallel computing manner to obtain a classification rule set in a decision tree form, and the classification rule set in the decision tree form is then applied to a data decision-making platform. The computer system may include a master computing node and a plurality of decision tree computing nodes, where the master computing node instructs, in a parallel computing manner, the plurality of decision tree computing nodes to participate in training the data sample in the matrix form. The method includes the following steps. 201: A discretization node of the computer system performs discretization processing on a data sample to obtain a data sample in a matrix form, and stores the data sample in the matrix form.

For a manner in which the discretization node of the computer system performs discretization processing on the data sample to obtain the data sample in the matrix form, refer to step 101, and details are not described herein again in this embodiment of the present disclosure.

After the data sample in the matrix form is obtained, the discretization node of the computer system may store the data sample in the matrix form locally or into another storage device, so that when the master computing node of the computer system subsequently instructs the plurality of decision tree computing nodes of the computer system to train the data sample in the matrix form, only a storage address of the data sample in the matrix form needs to be provided, and the data sample in the matrix form does not need to be sent to each of the decision tree computing nodes, thereby effectively saving resources.

The discretization node may be any computing node in the computer system, for example, the master computing node, the decision tree computing node, or any other computing node except the master computing node and the decision tree computing nodes.

202: The master computing node of the computer system sends a decision tree computing command to each of the decision tree computing nodes of the computer system, and each of the decision tree computing nodes trains, according to the decision tree computing command and using the decision tree algorithm, a part of the data sample in the matrix form to obtain a classification rule in the decision tree form, where a set of the classification rules in the decision tree form obtained by all of the decision tree computing nodes may be referred to as a classification rule set in a decision tree form.

In this embodiment of the present disclosure, the master computing node of the computer system may instruct, in the parallel computing manner, the plurality of decision tree computing nodes in the computer system to participate in training the data sample in the matrix form according to the decision tree algorithm, thereby improving computing efficiency. In this case, each of the decision tree computing nodes trains a part of the data sample in the matrix form to obtain the classification rule in the decision tree form (which may also be referred to as a decision tree); subsequently, a set of the classification rules in the decision tree form obtained by all of the decision tree computing nodes, that is, the classification rule set in the decision tree form, may be provided to the data decision-making platform, so that the data decision-making platform may perform data decision-making with reference to the classification rule in the decision tree form obtained by each of the decision tree computing nodes. The master computing node is different from the decision tree computing nodes.

To implement the foregoing parallel computing solution, a random forest manner may be used. A basic idea is as follows. The master computing node may instruct the plurality of decision tree computing nodes to train a part of the data sample in the matrix form for a plurality of rounds of training, and during each round of training, each of the decision tree computing nodes randomly extracts training samples from the data sample in the matrix form, perform training on the training samples, and put the training samples back, to obtain a decision tree (that is, a classification rule in a decision tree form). Because the plurality of decision tree computing nodes is used, a plurality of rounds of training may be performed in a parallel manner, which improves computing efficiency and facilitates massive data processing. Finally, a plurality of obtained decision trees may form a random forest, where each decision tree in the random forest is obtained by performing training on training data that is randomly selected from the data sample. When the data decision-making platform needs to perform decision-making on production data, a judgment may be made using each decision tree (that is, the classification rule in the decision tree form) in the random forest to determine a category to which the production data belongs for each decision tree (that is, the classification rule in the decision tree form). Then, classification results of all the decision trees are synthesized, and a category to which the production data belongs is predicted according to a preset voting rule. For example, a category of the production data is predicted if it is determined that the category is mostly frequently selected. In the random forest manner, a classification speed is fast, and parallel computing may be implemented.

Based on the foregoing basic idea, that the master computing node of the computer system sends a decision tree computing command to each of the decision tree computing nodes of the computer system, and each of the decision tree computing nodes trains, according to the decision tree computing command and using the decision tree algorithm, a part of the data sample in the matrix form to obtain a classification rule in the decision tree form may include the following steps. 202a: The master computing node acquires an algorithm configuration parameter, where the algorithm configuration parameter includes information about training samples in the data sample in the matrix form and information about an attribute that participates in decision tree generation.

The data sample in the matrix form may include a plurality of groups of attributes, such as age, current residence, income, work industry, credit record, and time deposit. A same attribute may play different roles in different services. For example, when the data sample in the matrix form is analyzed and users are classified into users to whom a loan may be released and users to whom a loan cannot be released, attributes of age, credit record, time deposit, and the like may be of more concern. In this case, the attributes of age, credit record, time deposit, and the like may be selected for performing decision tree generation. When the data sample in the matrix form is analyzed in another service demand, attributes of credit record, time deposit, and the like may be of little concern, but attributes of shopping time, type of goods purchased online, and the like may be of much concern. Therefore, the master computing node of the computer system needs to determine the information about the attribute that participates in decision tree generation from the attributes included in the data sample in the matrix form, so that the decision tree computing nodes may determine, according to the information about the attribute that participates in decision tree generation, the attribute that participates in decision tree generation. For example, the information about the attribute that participates in decision tree generation may be an identifier of the attribute that participates in decision tree generation; and subsequently, each of the decision tree computing nodes may directly determine, according to the identifier of the attribute that participates in decision tree generation, the attribute that participates in decision tree generation. For another example, the information about the attribute that participates in decision tree generation may be a quantity of attributes that participate in decision tree generation, and subsequently, each of the decision tree computing nodes may randomly select, according to the quantity of attributes that participate in decision tree generation, an attribute that participates in decision tree generation from all the attributes included in the data sample in the matrix form.

In addition, the master computing node further needs to determine the information about the training samples in the data sample in the matrix form, so that each of the decision tree computing nodes may obtain, according to the information about the training samples in the data sample in the matrix form, the training samples from the data sample in the matrix form to perform training, to obtain the classification rule in the decision tree form. For example, the information about the training samples in the data sample in the matrix form may include a storage address of the data sample in the matrix form, a ratio of the training samples to test samples in the data sample in the matrix form, and a ratio of a randomly acquired sample, so that each of the decision tree computing nodes may select the training samples according to the storage address of the data sample in the matrix form and the ratio of the training samples to the test sample in the data sample in the matrix form, and then, according to the ratio of a randomly acquired sample, randomly extract the selected training samples, perform training on the training samples, and put the training samples back.

The master computing node may acquire, in a plurality of manners, the information about the training samples in the data sample in the matrix form, and the information about the attribute that participates in decision tree generation, that is, the algorithm configuration parameter. For example, the master computing node may automatically generate the algorithm configuration parameter according to a preset rule or a preset service feature, the master computing node may acquire a preset algorithm configuration parameter, or the master computing node may receive an algorithm configuration parameter, which is not limited in this embodiment of the present disclosure.

Optionally, the master computing node may further determine a quantity of decision trees in the random forest, and determine, according to the quantity of decision trees in the random forest, a plurality of decision tree computing nodes from online computing nodes of the computer system, thereby computing the decision trees in the random forest in a parallel manner using the plurality of decision tree computing nodes. For example, when it is determined that the quantity of decision trees in the random forest is 15, 15 decision tree computing nodes may be selected from the online computing nodes; each of the decision tree computing nodes participates in one round of decision tree training to obtain one decision tree; and a random forest that is obtained by parallel computing performed by the 15 decision tree computing nodes includes 15 decision trees. Certainly, in another feasible manner, 2 to 14 decision tree computing nodes may also be selected, and each of the decision tree computing nodes performs at least one round of decision tree training to obtain one decision tree. The online computing nodes refer to computing nodes that can work properly in the computer system.

In this embodiment of the present disclosure, the computer system may be a supercomputer that includes a plurality of processors, or a distributed computer, for example, a cluster that includes several independent computers interconnected in a specific manner. In this case, the computing nodes (including the master computing node and the decision tree computing nodes) in the computer system may be processors, or independent computers, which is not limited in this embodiment of the present disclosure.

202b: The master computing node sends the decision tree computing command to each of the decision tree computing nodes, where the decision tree computing command carries the algorithm configuration parameter.

202c: Each of the decision tree computing nodes determines, according to the algorithm configuration parameter carried by the decision tree computing command, the training samples and the attribute that participates in decision tree generation from the data sample in the matrix form; and trains the determined training samples according to the determined attribute that participates in decision tree generation, to obtain the classification rule in the decision tree form.

After receiving the decision tree computing command, each of the decision tree computing nodes may randomly acquire the training samples from the data sample in the matrix form according to the information that is carried by the decision tree computing command and about the training samples in the data sample in the matrix form, and determine, according to the information that is carried by the decision tree computing command and about the attribute that participates in decision tree generation, the attribute that participates in decision tree generation, to train the determined training samples according to the determined attribute that participates in decision tree generation, to obtain a decision tree (that is, the classification rule in the decision tree form).

It should be noted that, although training data on which each of the decision tree computing nodes performs decision tree training is from the data sample in the matrix form, the training data on which each of the decision tree computing nodes performs decision tree training is randomly acquired from the data sample in the matrix form; therefore, the decision trees (that is, the classification rules in the decision tree form) obtained by all of the decision tree computing nodes by training are different, and are not associated with each other.

203: The master computing node sends a test command to each of the decision tree computing nodes after it is determined that each of the decision tree computing nodes obtains the classification rule in the decision tree form, and each of the decision tree computing nodes obtains a test sample set from the data sample in the matrix form according to the test command, and tests the test sample set using the classification rule in the decision tree form obtained by each of the decision tree computing nodes, to obtain a test result set.

The master computing node may further test the obtained classification rule set in the decision tree form after it is determined that each of the decision tree computing nodes obtains the classification rule in the matrix form, and apply the classification rule in the decision tree form to the data decision-making platform for data decision-making only when test accuracy is within a preset proper range. When the test accuracy is not within the preset proper range, training needs to be performed again to obtain a new classification rule set in the decision tree form. Each of the decision tree computing nodes may return a task completing indication after generation of the classification rule in the decision tree form is complete, so that the master computing node may send the test command to each of the decision tree computing nodes after all of the decision tree computing nodes return task completing indications; and each of the decision tree computing nodes may obtain the test sample set from the data sample in the matrix form according to the test command and using information about the test sample in the data sample in the matrix form, and test the test sample set using the classification rule in the decision tree form of each of the decision tree computing nodes, to obtain the test result set.

It should be noted that, the master computing node may provide the information about the test sample in the data sample in the matrix form to the decision tree computing nodes before the test starts. For example, the master computing node may add the information about the test sample in the data sample in the matrix form to the test command. The information about the test sample in the data sample in the matrix form may include the storage address of the data sample in the matrix form, and the ratio of the training samples to the test sample in the data sample in the matrix form. In this case, after receiving the test command, each of the decision tree computing nodes may acquire the test sample set from the storage address of the data sample in the matrix form according to the storage address of the data sample in the matrix form and the ratio of the training samples to the test sample in the data sample in the matrix form, where the test sample set may include a plurality of pieces of test data.

It should be noted that the test sample sets obtained by all of the decision tree computing nodes need to be the same, that is, test data is the same, so that the test result set obtained by each of the decision tree computing nodes may be subsequently voted for according to the preset voting rule, to obtain a final result set.

204: The master computing node acquires the test result set obtained by each of the decision tree computing nodes, and determines test accuracy according to a preset voting rule and the test result set obtained by each of the decision tree computing nodes; and when the test accuracy is within a preset proper range, step 205 is executed.

The master computing node may acquire the test result set obtained by testing by each of the decision tree computing nodes; then, determine the final result set according to the preset voting rule and the test result set obtained by each of the decision tree computing nodes; and determine the test accuracy according to the final result set.

For example, it is assumed that five decision tree computing nodes are used to perform training to obtain a classification rule A in a decision tree form, a classification rule B in the decision tree form, a classification rule C in the decision tree form, a classification rule D in the decision tree form, and a classification rule E in the decision tree form. A same test sample set is used to test the classification rules in the decision tree form obtained by all of the computing nodes to obtain five test result sets. This means that each test sample in the test sample set corresponds to five groups of test results. The master computing node may obtain a final test result set according to a method in which a test result with most occurrences of the five groups of test results corresponding to a same test sample is the final test result. For example, a test result of testing a test sample 1 in the test sample set using a rule A is that a loan may be released, a test result of testing the test sample 1 using a rule B is that a loan may not be released, a test result of testing the test sample 1 using a rule C is that a loan may not be released, a test result of testing the test sample 1 using a rule D is that a loan may not be released, and a test result of testing the test sample 1 using a rule E is that a loan may be released. In this case, a final test result of the test sample 1 is that a loan may not be released. Similarly, if the test sample set includes 10,000 test samples, final test results of the other 9,999 test samples may be obtained. Because an actual classification result of each test sample is known, test accuracy may be determined by comparing the actual classification results of all the test samples with the final test results obtained by testing.

When the test accuracy is within the preset proper range, step 205 is executed, so that each of the decision tree computing nodes applies, after rule conversion, the classification rule in the decision tree form of each of the decision tree computing nodes to the data decision-making platform. When the test accuracy is not within the preset proper range, training may be performed by adjusting training samples again in a manner of updating the data sample, adjusting a ratio of a randomly acquired sample, or the like.

205: Each of the decision tree computing nodes converts, according to an instruction of the master computing node or a preset conversion policy, the classification rule in the decision tree form of each of the decision tree computing nodes into a classification rule in a key-value form, and converts, using an expression form that can be recognized by the data decision-making platform, the classification rule in the decision tree form of each of the decision tree computing nodes into a classification rule that can be recognized by the data decision-making platform.

The foregoing classification rules that are obtained by computing using the decision tree computing nodes generally may exist on a computer in a form of variables or character strings. To allow the data decision-making platform to use the classification rules to perform data decision-making on production data, the classification rule set needs to be converted into the expression form that can be recognized by the data decision-making platform.

Each of the decision tree computing nodes may convert, according to the instruction of the master computing node or the preset conversion policy, the classification rule in the decision tree form of each of the decision tree computing nodes into the classification rule in the key-value form to facilitate storage and further conversion. The classification rule in the key-value form obtained by conversion includes an identifier of an attribute, information about a value corresponding to the attribute, and information about a classification result. For example, as shown in Table 1, each group of attributes of the data sample in the matrix form may be represented by a character with a subscript. If a meaning expressed by the classification rule in the decision tree form is [early adult age $S_5$, middle-class area $Q_2$, high credit limit H3, loan may be released; middle age $S_6$, income over 1 million CNY C5, loan may be released], the classification rule in the decision tree form may be converted into the following rule in the key-value form: [1:5, 2:2, 4:3, 1; 1:6, 3:5, 1], where 1:5 represents that a subscript of the first attribute is 5, that is, $S_5$; 2:2 represents that a subscript of the second attribute is 2, that is, $Q_2$; 4:3 represents that a subscript of the fourth attribute is 3, that is, H3; and 1 indicates that a loan may be released. A plurality of rules in the classification rule in the decision tree form is separated by a semicolon ";". The foregoing expression form of the rule in the key-value form is merely an example. In another embodiment, the identifier of the attribute, the information about the value corresponding to the attribute, and the information about the classification result may be in another expression form, and a plurality of rules may be separated by another character, which is not limited in this embodiment of the present disclosure. Converting the classification rule in the decision tree form into a rule in the key-value form not only facilitates storage or further conversion, but also facilitates high-speed matching test. Therefore, in step 203, when each of the decision tree computing nodes tests the classification rule in the decision tree form of each of the decision tree computing nodes, the classification rule in the decision tree form may be first converted into a rule in the key-value form, and testing is then performed, which may improve test efficiency.

After converting the classification rule in the decision tree form of each of the decision tree computing nodes into the classification rule in the key-value form, each of the decision tree computing nodes may convert, using the expression form that can be recognized by the data decision-making platform, the classification rule in the decision tree form of each of the decision tree computing nodes into the classification rule that can be recognized by the data decision-making platform. For example, if a regular expression is the expression form that can be recognized by the data decision-making platform, each of the decision tree computing nodes may convert the classification rule in the key-value form into a regular rule using the regular expression. The regular expression is also referred to as a formal representation or a normal representation, which uses a single character string to describe and match a series of character strings that meet a syntax rule, and can be recognized on most technical platforms. For example, a classification rule in the key-value form [1:3; 1:2, 0:3; 1:2, 0:2; 1:2, 0:0; 1:1; 1:0, 0:3; 1:0, 0:1; 1:0, 0:0;] may be converted into a regular rule [\\d3\\d*|22\\d*|02\\d*|\\d1\\d*|30\\d*|11\\d*|00\\d*|32\\d*|] using the regular expression. By expressing a classification rule in a regular expression form, the classification rule can be directly recognized and applied by the data decision-making platform; moreover, the classification rule may further be replaced or updated in real time on the data decision-making platform. Optionally, because a binary expression form generally can be recognized by any language and any technical platform, and has better commonality, each of the decision tree computing nodes may further convert a form of the regular rule obtained by each of the decision tree computing nodes into a binary expression.

Optionally, each of the decision tree computing nodes may further convert, using an expression form that can be recognized by the data decision-making platform, the classification rule in the decision tree form of each of the decision tree computing nodes into a classification rule that can be recognized by the data decision-making platform. The expression form that can be recognized by the data decision-making platform may be a regular expression or a binary expression.

It should be noted that, in step 203, when each of the decision tree computing nodes tests the classification rule in the decision tree form of each of the decision tree computing nodes, each of the decision tree computing nodes may perform the test after converting the classification rule in the decision tree form into a classification rule in a key-value form or a regular rule, to improve test efficiency and save test time. For example, according to experiments, for 100,000 pieces of test data, if a rule in the decision tree form has 10,000 branches, and each branch has three combinations, it takes only 46 seconds to obtain a test result after the rule is converted into a regular rule, which greatly improves test efficiency and saves test time.

206: The master computing node acquires the classification rule that is obtained by each of the decision tree computing nodes and can be recognized by the data decision-making platform, to obtain a classification rule set that can be recognized by the data decision-making platform, where the classification rule set that can be recognized by the data decision-making platform is a set of the classification rules that are obtained by all of the decision tree computing nodes and can be recognized by the data decision-making platform; and provides the classification rule set that can be recognized by the data decision-making platform to the data decision-making platform.

In this embodiment of the present disclosure, the classification rules (that is, the classification rule set that can be recognized by the data decision-making platform) that are obtained by all of the decision tree computing nodes and can be recognized by the data decision-making platform are provided to the data decision-making platform by the master computing node. Step 206 is an optional manner; the classification rule set that can be recognized by the data decision-making platform may be provided to the data decision-making platform in another manner. Optionally, step 206 may be replaced with the following step. 206': The master computing node sends a rule submission instruction to each of the decision tree computing nodes, and each of the decision tree computing nodes may provide, according to the rule submission instruction, the classification rule that is obtained by each of the decision tree computing nodes and can be recognized by the data decision-making platform to the data decision-making platform, so that each of the decision tree computing nodes may directly provide the classification rule that is obtained by each of the decision tree computing nodes and can be recognized by the data decision-making platform to the data decision-making platform without using the master computing node.

In this embodiment of the present disclosure, a computer system may perform discretization processing on a data sample to obtain a data sample in a matrix form; train the data sample in the matrix form according to a preset classification method to obtain a classification rule set; and after converting the classification rule set into a classification rule set that can be recognized by a data decision-making platform, provide the classification rule set to the data decision-making platform, so that the data decision-making platform can perform data decision-making according to the classification rule set that is obtained by the computer system by conversion and can be recognized by the data decision-making platform. All the foregoing processes from training the data sample (that is, performing modeling on the data sample) to applying the classification rule set (that is, a modeling result) obtained by training to performing data decision-making are automatically completed by the computer system, which avoids human participation; and when the data sample changes or an original classification rule set needs to be updated, an updated classification rule set can be obtained in a timely manner, and the updated classification rule set is applied to the data decision-making platform in a timely manner for data decision-making.

Figure 3:
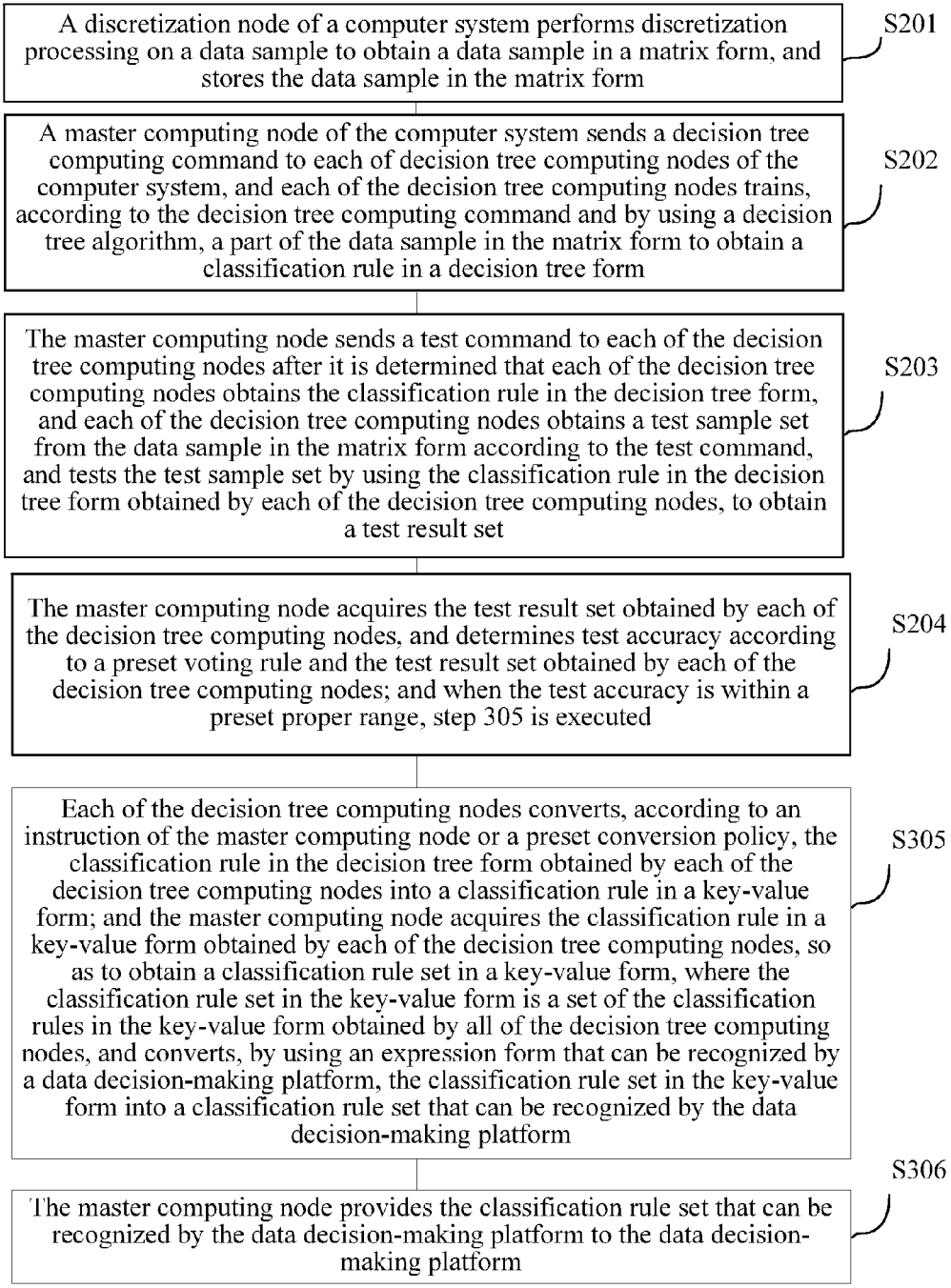
FIG. 3 is a flowchart of another data processing method according to an embodiment of the present disclosure.

In step 205, each of the decision tree computing nodes converts the classification rule in the decision tree form of each of the decision tree computing nodes into the classification rule that can be recognized by the data decision-making platform. However, during a practical application process, when the classification rule in the decision tree form is converted into the classification rule that can be recognized by the data decision-making platform, first the classification rule in the decision tree form needs to be converted into a classification rule in a key-value form. Therefore, each of the decision tree computing nodes may provide, after converting the classification rule in the decision tree form of each of the decision tree computing nodes into a classification rule in the key-value form, the classification rule in the key-value form to the master computing node; and the master computing node converts the classification rules in the key-value form obtained by all of the decision tree computing nodes into the classification rules that can be recognized by the data decision-making platform. Therefore, as shown in FIG. 3, step 205 may also be the following step. 305: Each of the decision tree computing nodes converts, according to an instruction of the master computing node or a preset conversion policy, the classification rule in the decision tree form obtained by each of the decision tree computing nodes into a classification rule in a key-value form; and the master computing node acquires the classification rule in the key-value form obtained by each of the decision tree computing nodes, to obtain a classification rule set in the key-value form, where the classification rule set in the key-value form is a set of the classification rules in the key-value form obtained by all of the decision tree computing nodes, and converts, using an expression form that can be recognized by the data decision-making platform, the classification rule set in the key-value form into a classification rule set that can be recognized by the data decision-making platform.

Correspondingly, step 206/206' may be replaced with the following step. 306: The master computing node provides the classification rule set that can be recognized by the data decision-making platform to the data decision-making platform.

Optionally, after step 206, 206', or 306, if accuracy is high and reaches an expected value when the data decision-making platform performs data decision-making on the production data using a regular rule set, the data decision-making platform may be instructed to continue to use the rule. However, if the accuracy is low and fails to reach the expected value, the computer system may update the data sample and perform training again, to obtain an updated classification rule set, and provide the updated classification rule set to the data decision-making platform to improve accuracy of data decision-making.

Embodiment 3

Figure 4:
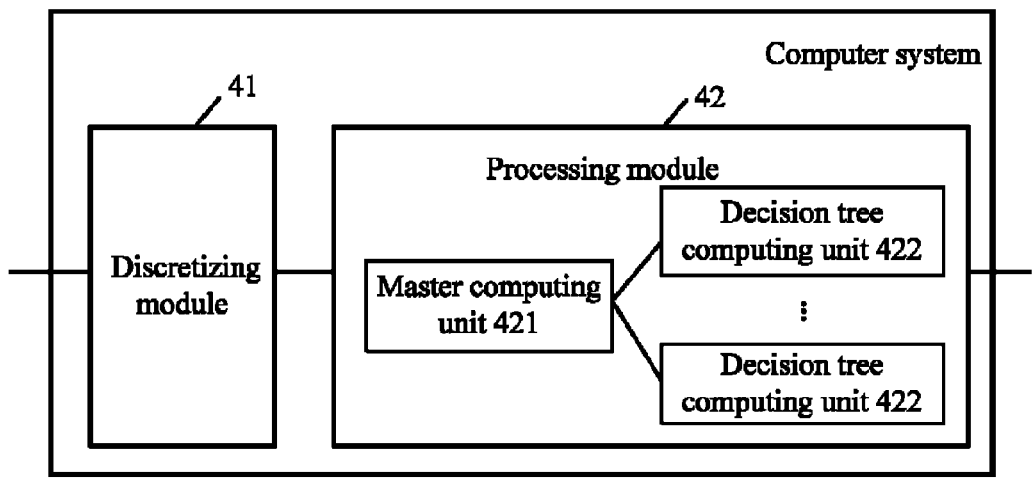
FIG. 4 is a schematic diagram of a computer system according to an embodiment of the present disclosure.

This embodiment of the present disclosure provides a computer system. As shown in FIG. 4, the computer system may include a discretizing module 41 and a processing module 42.

The discretizing module 41 is configured to perform discretization processing on a data sample to obtain a data sample in a matrix form. The data sample may be massive data; and in a manner of discretization processing, not only can a form of the data sample be converted into a matrix, but computing efficiency may be improved.

The processing module 42 is configured to train the data sample in the matrix form according to a preset classification method to obtain a classification rule set; convert, using an expression form that can be recognized by a data decision-making platform, the classification rule set into a classification rule set that can be recognized by the data decision-making platform; and provide the classification rule set that is obtained by conversion and can be recognized by the data decision-making platform to the data decision-making platform. In this embodiment of the present disclosure, the preset classification method may be a decision tree algorithm; the processing module 42 may train the data sample in the matrix form according to the decision tree algorithm to obtain a classification rule set in a decision tree form; and convert, using the expression form that can be recognized by the data decision-making platform, the classification rule set in the decision tree form into the classification rule set that can be recognized by the data decision-making platform. The training the data sample in the matrix form is performing modeling on the data sample in the matrix form; and the classification rule set obtained by training is a modeling result obtained by modeling. The expression form that can be recognized by the data decision-making platform may be a regular expression or a binary expression, and the data decision-making platform may be a cloud platform.

Optionally, when the data sample is massive data, to quickly and efficiently process the massive data, the processing module 42 may further train, according to the preset classification method, the data sample in the matrix form in a parallel computing manner to obtain the classification rule set. In this case, the processing module 42 may further include a master computing unit 21 and a plurality of decision tree computing units 422.

The master computing unit 421 is configured to send a decision tree computing command to each of the decision tree computing units 422.

Each of the decision tree computing units 422 is configured to train, according to the decision tree computing command and using the decision tree algorithm, a part of the data sample in the matrix form to obtain a classification rule in the decision tree form; where the classification rule set in the decision tree form is a set of the classification rules in the decision tree form obtained by all of the decision tree computing units 422. The plurality of decision tree computing units 422 participates in the training, that is, participates in computing the classification rule set, thereby greatly improving computing efficiency.

The master computing unit 421 may acquire an algorithm configuration parameter, where the algorithm configuration parameter includes information about training samples in the data sample in the matrix form and information about an attribute that participates in decision tree generation; and send the decision tree computing command to each of the decision tree computing units 422, where the decision tree computing command carries the algorithm configuration parameter. The information about the attribute that participates in decision tree generation may be an identifier of the attribute that participates in decision tree generation; and subsequently, each of the decision tree computing units 422 may directly determine, according to the identifier of the attribute that participates in decision tree generation, the attribute that participates in decision tree generation. For another example, the information about the attribute that participates in decision tree generation may be a quantity of attributes that participate in decision tree generation; and subsequently, each of the decision tree computing units 422 may randomly select, according to the quantity of attributes that participate in decision tree generation, an attribute that participates in decision tree generation from all the attributes included in the data sample in the matrix form. The information about the training samples in the data sample in the matrix form may include a storage address of the data sample in the matrix form, a ratio of the training samples to test samples in the data sample in the matrix form, and a ratio of a randomly acquired sample, so that each of the decision tree computing units 422 may select the training samples according to the storage address of the data sample in the matrix form and the ratio of the training samples to the test sample in the data sample in the matrix form, and then, according to the ratio of a randomly acquired sample, randomly extract the selected training samples, perform training on the training samples, and put the training samples back.

Each of the decision tree computing units 422 may determine, according to the algorithm configuration parameter carried by the decision tree computing command, the training samples and the attribute that participates in decision tree generation from the data sample in the matrix form; and train the determined training samples according to the determined attribute that participates in decision tree generation, to obtain the classification rule in the decision tree form. After receiving the decision tree computing command, each of the decision tree computing units 422 may randomly acquire the training samples from the data sample in the matrix form according to the information that is carried by the decision tree computing command and about the training samples in the data sample in the matrix form; and determine, according to the information that is carried by the decision tree computing command and about the attribute that participates in decision tree generation, the attribute that participates in decision tree generation, to train the determined training samples according to the determined attribute that participates in decision tree generation, to obtain a decision tree (that is, the classification rule in the decision tree form). It should be noted that, although training data on which each of the decision tree computing units 422 performs decision tree training is from the data sample in the matrix form, the training data on which each of the decision tree computing units 422 performs decision tree training is randomly acquired from the data sample in the matrix form; therefore, the decision trees (that is, the classification rules in the decision tree form) obtained by all of the decision tree computing units 422 by training are different, and are not associated with each other.

The master computing unit 421 and the decision tree computing units 422 may be processors in the computer system or independent computers in the computer system, which is not limited in this embodiment of the present disclosure.

Optionally, after it is determined that each of the decision tree computing units 422 obtains the classification rule in the matrix form, the master computing unit 421 may further test the obtained classification rule set in the decision tree form, and apply the classification rule in the decision tree form to the data decision-making platform for data decision-making only when test accuracy is within a preset proper range. When the test accuracy is not within the preset proper range, training needs to be performed again to obtain a new classification rule set in the decision tree form. The master computing unit 421 may further send a test command to each of the decision tree computing units 422 after it is determined that each of the decision tree computing units 422 obtains the classification rule in the decision tree form. Each of the decision tree computing units 422 may further obtain a test sample set from the data sample in the matrix form according to the test command, and test the test sample set using the classification rule in the decision tree form obtained by each of the decision tree computing units, to obtain a test result set. The master computing unit 421 may further acquire the test result set obtained by each of the decision tree computing units 422; determine test accuracy according to a preset voting rule and the test result set obtained by each of the decision tree computing units 422; and when the test accuracy is within a preset proper range, execute an operation of converting the classification rule set into the classification rule set that can be recognized by the data decision-making platform. It should be noted that the test sample sets obtained by all of the decision tree computing units 422 need to be the same, that is, test data is the same, so that the test result set obtained by each of the decision tree computing units 422 may be subsequently voted for according to the preset voting rule, to obtain a final result set.

Optionally, each of the decision tree computing units 422 may further convert, according to an instruction of the master computing unit 421 or a preset conversion policy and using the expression form that can be recognized by the data decision-making platform, the classification rule in the decision tree form obtained by each of the decision tree computing units into the classification rule that can be recognized by the data decision-making platform; where the classification rule set that can be recognized by the data decision-making platform is a set of the classification rules that are obtained by all of the decision tree computing units 422 and can be recognized by the data decision-making platform.

In this case, the master computing unit 421 may further acquire the classification rule that is obtained by each of the decision tree computing units 422 and can be recognized by the data decision-making platform, to obtain the classification rule set that can be recognized by the data decision-making platform; and provide the classification rule set that can be recognized by the data decision-making platform to the data decision-making platform. Alternatively, the master computing unit 421 may further send a rule submission instruction to each of the decision tree computing units 422; and each of the decision tree computing units 422 may further provide, according to the rule submission instruction, the classification rule that is obtained by each of the decision tree computing units and can be recognized by the data decision-making platform to the data decision-making platform.

Optionally, each of the decision tree computing units 422 may further convert, according to an instruction of the master computing unit 421 or a preset conversion policy, the classification rule in the decision tree form obtained by each of the decision tree computing units into a classification rule in a key-value form. The master computing unit 421 may further acquire the classification rule in the key-value form obtained by each of the decision tree computing units 422, to obtain a classification rule set in the key-value form, where the classification rule set in the key-value form is a set of the classification rules in the key-value form obtained by all of the decision tree computing units 422; convert, using the expression form that can be recognized by the data decision-making platform, the classification rule set in the key-value form into a classification rule set that can be recognized by the data decision-making platform; and provide the classification rule set that can be recognized by the data decision-making platform to the data decision-making platform.

Optionally, the expression form that can be recognized by the data decision-making platform may be at least one of a regular expression and a binary expression.

In this embodiment of the present disclosure, a discretizing module 41 in a computer system may perform discretization processing on a data sample to obtain a data sample in a matrix form; and a processing module 42 in the computer system may train the data sample in the matrix form according to a preset classification method to obtain a classification rule set, and after converting the classification rule set into a classification rule set that can be recognized by a data decision-making platform, provide the classification rule set to the data decision-making platform, so that the data decision-making platform can perform data decision-making according to the classification rule set that is obtained by the computer system by conversion and can be recognized by the data decision-making platform. All the foregoing processes from training the data sample (that is, performing modeling on the data sample) to applying the classification rule set (that is, a modeling result) obtained by training to performing data decision-making are automatically completed by the computer system, which avoids human participation; and when the data sample changes or an original classification rule set needs to be updated, an updated classification rule set can be obtained in a timely manner, and the updated classification rule set is applied to the data decision-making platform in a timely manner for data decision-making.

The computer system provided by this embodiment of the present disclosure can execute the method process of the data processing method described in Embodiment 1 or Embodiment 2, and details are not described herein again in this embodiment of the present disclosure.

Figure 5:
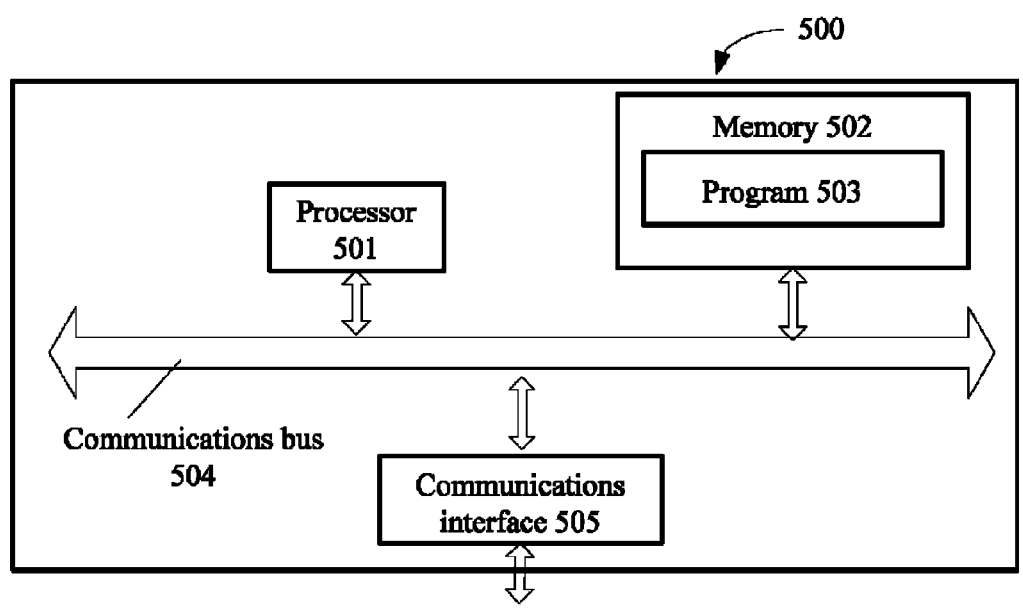
FIG. 5 is a schematic diagram of structural composition of another computer system according to an embodiment of the present disclosure.

As shown in FIG. 5, an embodiment of the present disclosure provides a computer system 500, where the computer system may include a processor 501, a memory 502, a communications bus 504, and a communications interface 505, where the processor 501, the memory 502, and the communications interface 505 are connected and communicate with each other using the communications bus 504.

The processor 501 may be a single-core or multi-core central processing unit or an application-specific integrated circuit, or may be configured as one or more integrated circuits implementing the embodiments of the present disclosure.

The memory 502 may be a high-speed random access memory (RAM) or a non-volatile memory, such as at least one disk memory.

The memory 502 is configured to store a computer executable instruction 503. The computer executable instruction 503 may include program code.

When the computer system runs, the processor 501 executes the computer executable instruction 503, which may execute the method process of the data processing method in Embodiment 1 or Embodiment 2.

An embodiment of the present disclosure further provides a computer readable medium, including a computer executable instruction, so that when a processor of a computer executes the computer executable instruction, the computer executes the data processing method described in Embodiment 1 or the data processing method described in Embodiment 2.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
    performing, by a computer system, discretization processing on a first data sample to obtain a second data sample in a matrix form;
    training, by the computer system, the second data sample in the matrix form according to a preset classification method to obtain a first classification rule set in a decision tree form, wherein the preset classification method is a decision tree algorithm;
    converting, by the computer system using an expression form that can be recognized by a data decision-making platform, the first classification rule set in the decision tree form into a second classification rule set that can be recognized by the data decision-making platform; and
    providing, by the computer system, the second classification rule set that is obtained by conversion and can be recognized by the data decision-making platform to the data decision-making platform.

2. The method according to claim 1, wherein the computer system comprises:
    a master computing node; and
    a plurality of decision tree computing nodes, wherein training, by the computer system, the second data sample in the matrix form according to the decision tree algorithm to obtain the first classification rule set in the decision tree form comprises:
        sending, by the master computing node, a decision tree computing command to each of the decision tree computing nodes; and
        training, by each of the decision tree computing nodes according to the decision tree computing command and using the decision tree algorithm, a part of the second data sample in the matrix form to obtain the first classification rule in the decision tree form, and
    wherein the first classification rule set in the decision tree form is a set of the first classification rules in the decision tree form obtained by all of the decision tree computing nodes.

3. The method according to claim 2, wherein converting, by the computer system using the expression form that can be recognized by the data decision-making platform, the first classification rule set in the decision tree form into the second classification rule set that can be recognized by the data decision-making platform comprises converting, by each of the decision tree computing nodes according to an instruction of the master computing node or a preset conversion policy and using the expression form that can be recognized by the data decision-making platform, the first classification rule in the decision tree form obtained by each of the decision tree computing nodes into the second classification rule that can be recognized by the data decision-making platform, and wherein the second classification rule set that can be recognized by the data decision-making platform is a set of the second classification rules that are obtained by all of the decision tree computing nodes and can be recognized by the data decision-making platform.

4. The method according to claim 3, wherein providing, by the computer system, the second classification rule set that can be recognized by the data decision-making platform to the data decision-making platform comprises:
    acquiring, by the master computing node, the second classification rule that is obtained by each of the decision tree computing nodes and can be recognized by the data decision-making platform, to obtain the second classification rule set that can be recognized by the data decision-making platform; and
    providing, by the master computing node, the second classification rule set that can be recognized by the data decision-making platform to the data decision-making platform.

5. The method according to claim 3, wherein providing, by the computer system, the second classification rule set that can be recognized by the data decision-making platform to the data decision-making platform comprises:
    sending, by the master computing node, a rule submission instruction to each of the decision tree computing nodes; and
    providing, by each of the decision tree computing nodes according to the rule submission instruction, the second classification rule that is obtained by each of the decision tree computing nodes and can be recognized by the data decision-making platform to the data decision-making platform.

6. The method according to claim 2, wherein converting, by the computer system using the expression form that can be recognized by the data decision-making platform, the first classification rule set in the decision tree form into the second classification rule set that can be recognized by the data decision-making platform comprises:
  converting, by each of the decision tree computing nodes according to an instruction of the master computing node or a preset conversion policy, the first classification rule in the decision tree form obtained by each of the decision tree computing nodes into a classification rule in a key-value form;
  acquiring, by the master computing node, the classification rule in the key-value form obtained by each of the decision tree computing nodes, to obtain a classification rule set in the key-value form, wherein the classification rule set in the key-value form is a set of the classification rules in the key-value form obtained by all of the decision tree computing nodes; and
  converting, by the master computing node using the expression form that can be recognized by the data decision-making platform, the classification rule set in the key-value form into the second classification rule set that can be recognized by the data decision-making platform, and wherein providing, by the computer system, the second classification rule set that can be recognized by the data decision-making platform to the data decision-making platform comprises providing, by the master computing node, the second classification rule set that can be recognized by the data decision-making platform to the data decision-making platform.

7. The method according to claim 2, wherein sending, by the master computing node, the decision tree computing command to each of the decision tree computing nodes, and training, by each of the decision tree computing nodes according to the decision tree computing command and using the decision tree algorithm, the part of the second data sample in the matrix form to obtain the first classification rule in the decision tree form comprise:
  acquiring, by the master computing node, an algorithm configuration parameter, wherein the algorithm configuration parameter comprises information about training samples in the second data sample in the matrix form and information about an attribute that participates in decision tree generation;
  sending, by the master computing node, the decision tree computing command to each of the decision tree computing nodes, wherein the decision tree computing command carries the algorithm configuration parameter;
  determining, by each of the decision tree computing nodes according to the algorithm configuration parameter carried by the decision tree computing command, the training samples and the attribute that participates in decision tree generation from the second data sample in the matrix form; and
  training the training samples determined by each of the decision tree computing nodes according to the attribute that participates in the decision tree generation, to obtain the first classification rule in the decision tree form.

8. The method according to claim 7, further comprising:
  sending, by the master computing node, a test command to each of the decision tree computing nodes after it is determined that each of the decision tree computing nodes obtains the first classification rule in the decision tree form;
  obtaining, by each of the decision tree computing nodes, a test sample set from the second data sample in the matrix form according to the test command;
  testing the test sample set using the first classification rule in the decision tree form obtained by each of the decision tree computing nodes, to obtain a test result set;
  acquiring, by the master computing node, the test result set obtained by each of the decision tree computing nodes;
  determining, by the master computing node, test accuracy according to a preset voting rule and the test result set obtained by each of the decision tree computing nodes; and
  converting, by the master computing node, the first classification rule set into the second classification rule set that can be recognized by the data decision-making platform when the test accuracy is within a preset proper range.

9. The method according to claim 8, wherein the information about the training samples in the second data sample in the matrix form comprises:
  a storage address of the second data sample in the matrix form;
  a ratio of the training samples to test samples in the second data sample in the matrix form; and
  a ratio of a randomly acquired sample to the second data sample in the matrix form.

10. A computer system, comprising:
  a memory configured to store a computer executable instruction; and
  a processor coupled to the memory and configured to:
    perform discretization processing on a first data sample to obtain a second data sample in a matrix form; and
    train the second data sample in the matrix form according to a preset classification method to obtain a first classification rule set in a decision tree form, wherein the preset classification method is a decision tree algorithm;
    convert, using an expression form that can be recognized by a data decision-making platform, the first classification rule set in the decision tree form into a second classification rule set that can be recognized by the data decision-making platform; and
    provide the second classification rule set that is obtained by conversion and can be recognized by the data decision-making platform to the data decision-making platform.

11. The computer system according to claim 10, wherein the processor is further configured to send a decision tree computing command to each of the decision tree computing units, wherein the computer system further comprises a plurality of decision tree computing units, wherein each of the decision tree computing units of the plurality of decision tree computing units is configured to train, according to the decision tree computing command and using the decision tree algorithm, a part of the second data sample in the matrix form to obtain a first classification rule in the decision tree form, and wherein the first classification rule set in the decision tree form is a set of the first classification rules in the decision tree form obtained by all of the decision tree computing units.

12. The computer system according to claim 11, wherein each of the decision tree computing units is further configured to convert, according to an instruction of the processor or a preset conversion policy and using the expression form that can be recognized by the data decision-making platform, the first classification rule in the decision tree form obtained by each of the decision tree computing units into the second classification rule that can be recognized by the data decision-making platform, and wherein the second classification rule set that can be recognized by the data decision-making platform is a set of the second classification rules that are obtained by all of the decision tree computing units and can be recognized by the data decision-making platform.

13. The computer system according to claim 11, wherein the processor is further configured to:
acquire an algorithm configuration parameter, wherein the algorithm configuration parameter comprises information about training samples in the second data sample in the matrix form and information about an attribute that participates in decision tree generation; and
send the decision tree computing command to each of the decision tree computing units, wherein the decision tree computing command carries the algorithm configuration parameter, and wherein each of the decision tree computing units is further configured to:
determine, according to the algorithm configuration parameter carried by the decision tree computing command, the training samples and the attribute that participates in the decision tree generation from the second data sample in the matrix form; and
train the training samples determined according to the algorithm configuration parameter carried by the decision tree computing command, according to the attribute that participates in the decision tree generation, to obtain the first classification rule in the decision tree form.

14. The computer system according to claim 13, wherein each of the decision tree computing units is further configured to convert, according to an instruction of the processor or a preset conversion policy, the first classification rule in the decision tree form obtained by each of the decision tree computing units into a classification rule in a key-value form, and wherein the processor is further configured to:
acquire the classification rule in the key-value form obtained by each of the decision tree computing units, to obtain a classification rule set in the key-value form, wherein the classification rule set in the key-value form is a set of the classification rules in the key-value form obtained by all of the decision tree computing units;
convert, using the expression form that can be recognized by the data decision-making platform, the classification rule set in the key-value form into the second classification rule set that can be recognized by the data decision-making platform; and
provide the second classification rule set that can be recognized by the data decision-making platform to the data decision-making platform.

15. The computer system according to claim 13, wherein the processor is further configured to send a test command to each of the decision tree computing units after it is determined that each of the decision tree computing units obtains the first classification rule in the decision tree form, wherein each of the decision tree computing units is further configured to:
obtain a test sample set from the second data sample in the matrix form according to the test command;
test the test sample set using the first classification rule in the decision tree form obtained by each of the decision tree computing units, to obtain a test result set, and wherein the processor is further configured to:
acquire the test result set obtained by each of the decision tree computing units;

determine test accuracy according to a preset voting rule and the test result set obtained by each of the decision tree computing units; and
execute an operation of converting the first classification rule set into the second classification rule set that can be recognized by the data decision-making platform when the test accuracy is within a preset proper range.

16. The computer system according to claim 15, wherein the information about the training samples in the second data sample in the matrix form comprises:
a storage address of the second data sample in the matrix form;
a ratio of the training samples to test samples in the second data sample in the matrix form; and
a ratio of a randomly acquired sample to the second data sample in the matrix form.

17. A computer system, wherein the computer system comprises:
a bus;
a memory configured to store a computer executable instruction;
a processor coupled to the memory using the bus; and
a communications interface coupled to the processor, wherein when the computer system runs, the processor executes the computer executable instruction stored in the memory, so that the computer system is configured to:
perform discretization processing on a first data sample to obtain a second data sample in a matrix form;
train the second data sample in the matrix form according to a preset classification method to obtain a first classification rule set in a decision tree form, wherein the preset classification method is a decision tree algorithm;
convert, using an expression form that can be recognized by a data decision-making platform, the first classification rule set in the decision tree form into a second classification rule set that can be recognized by the data decision-making platform; and
provide the second classification rule set that is obtained by conversion and can be recognized by the data decision-making platform to the data decision-making platform.

18. A non-transitory computer readable medium, comprising:
a computer executable instruction, so that when a processor of a computer executes the computer executable instruction, the computer is configured to:
perform discretization processing on a first data sample to obtain a second data sample in a matrix form;
train the second data sample in the matrix form according to a preset classification method to obtain a first classification rule set in a decision tree form wherein the preset classification method is a decision tree algorithm;
convert, using an expression form that can be recognized by a data decision-making platform, the first classification rule set in the decision tree form into a second classification rule set that can be recognized by the data decision-making platform; and
provide the second classification rule set that is obtained by conversion and can be recognized by the data decision-making platform to the data decision-making platform.

* * * * *